United States Patent
Hayashi (10) Patent No.: US 11,930,140 B2
(45) Date of Patent: Mar. 12, 2024

(54) INFORMATION PROCESSING DEVICE, INFORMATION PROCESSING METHOD, AND NON-TRANSITORY COMPUTER-READABLE STORAGE MEDIUM STORING PROGRAM

(71) Applicant: SEIKO EPSON CORPORATION, Tokyo (JP)

(72) Inventor: Ryotaro Hayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/160,107

(22) Filed: Jan. 26, 2023

(65) Prior Publication Data

US 2023/0247149 A1 Aug. 3, 2023

(30) Foreign Application Priority Data

Jan. 28, 2022 (JP) .................... 2022-011723

(51) Int. Cl.
*H04N 1/00* (2006.01)

(52) U.S. Cl.
CPC ..... *H04N 1/00424* (2013.01); *H04N 1/00448* (2013.01); *H04N 1/0045* (2013.01)

(58) Field of Classification Search
CPC ............ B41M 3/008; B41M 5/0023; B41M 2205/38; B41M 5/00; B41M 2205/40; B41M 1/18; H04N 1/00424; H04N 1/00448; H04N 1/0045
See application file for complete search history.

(56) References Cited

U.S. PATENT DOCUMENTS

| | | | | |
|---|---|---|---|---|
| 8,259,372 B2 * | 9/2012 | Suzuki | ............... | H04N 1/00453 358/1.9 |
| 11,418,683 B1 * | 8/2022 | Ramsey | ............... | H04N 1/2353 |
| 2006/0262367 A1 * | 11/2006 | Hattori | ................. | G03H 1/0256 359/15 |
| 2007/0146469 A1 * | 6/2007 | Takizawa | .................... | B41J 3/46 347/212 |
| 2009/0109457 A1 * | 4/2009 | Koyano | ............. | G06K 15/1807 358/1.9 |
| 2009/0213160 A1 * | 8/2009 | Murai | ........................ | B41J 2/21 347/14 |
| 2009/0213161 A1 * | 8/2009 | Murai | ................... | G06F 3/1242 347/15 |
| 2009/0303504 A1 * | 12/2009 | Iinuma | ............. | G03G 15/04018 358/1.9 |
| 2010/0007902 A1 * | 1/2010 | Kikuchi | ................ | G06F 3/1204 358/1.9 |

(Continued)

FOREIGN PATENT DOCUMENTS

JP 2017-159552 A 9/2017

*Primary Examiner* — Justin S Lee
(74) *Attorney, Agent, or Firm* — WORKMAN NYDEGGER (57) ABSTRACT

An information processing device includes an acquisition unit configured to obtain a group datum in which a plurality of print layers to be printed in a stacked manner is grouped, and a display controller configured to make a display unit output a plurality of icons which corresponds respectively to the plurality of print layers included in the group datum, and which is arranged in an order of stacking the print layers corresponding to the icons, as layer configuration information representing a layer configuration of the group datum.

9 Claims, 9 Drawing Sheets

(56) References Cited

U.S. PATENT DOCUMENTS

| | | | | |
|---|---|---|---|---|
| 2011/0058192 | A1* | 3/2011 | Hatanaka | H04N 1/54 |
| | | | | 358/1.9 |
| 2014/0085648 | A1* | 3/2014 | Kawamura | H04N 1/40062 |
| | | | | 358/1.9 |
| 2016/0246205 | A1* | 8/2016 | Hirano | G03G 15/0178 |
| 2017/0264789 | A1* | 9/2017 | Miyahara | H04N 1/6011 |
| 2019/0066551 | A1* | 2/2019 | Horiuchi | G06F 3/1279 |
| 2019/0208087 | A1* | 7/2019 | Tajima | G06F 3/1256 |
| 2019/0384549 | A1* | 12/2019 | Miyasaka | G06F 3/1255 |
| 2019/0384551 | A1* | 12/2019 | Miyasaka | G06F 3/1256 |
| 2020/0175345 | A1* | 6/2020 | Itogawa | G06K 15/181 |
| 2020/0210117 | A1* | 7/2020 | Miyasaka | G06F 3/1205 |
| 2023/0013495 | A1* | 1/2023 | Kivimäki | C09J 7/385 |

* cited by examiner

INFORMATION PROCESSING DEVICE, INFORMATION PROCESSING METHOD, AND NON-TRANSITORY COMPUTER-READABLE STORAGE MEDIUM STORING PROGRAM

The present application is based on, and claims priority from JP Application Serial Number 2022-011723, filed Jan. 28, 2022, the disclosure of which is hereby incorporated by reference herein in its entirety.

BACKGROUND

1. Technical Field

The present disclosure relates to an information processing device, an information processing method, and a non-transitory computer-readable storage medium storing a program.

2. Related Art

In printing, printing is performed by stacking a plurality of printing layers in some cases. For example, an image layer and a foundation layer to be a foundation of the image layer are printed so as to overlap each other in some cases. In JP-A-2017-159552 (Document 1), there is disclosed a technology of designating a plurality of layers of color materials to be printed in a stacked manner via a GUI screen.

Regarding the plurality of printing layers which is grouped as a printing target, and which is to be printed, there is a desire of checking a layer configuration. In Document 1, the designation of an order of stacking the layers of the color materials is received as a condition used in generation of a preview image of a printed result via the GUI screen. In Document 1, there is disposed a plurality of check columns corresponding to the plurality of color materials layer by layer, and by inputting a check in any of the check columns, what color material is used in the corresponding layer is designated. Therefore, in order to confirm the layer configuration of the plurality of layers to be stacked on one another, it is required to confirm what check column out of the plurality of check columns is provided with a check with respect to each of the layers after providing the check to the check column. The user is required to take a lot of trouble with confirming what check column out of the plurality of check columns is provided with the check layer by layer. Therefore, in Document 1, there is taken a lot of trouble with confirming the layer configuration of the printed layer stacked on one another.

SUMMARY

In view of the problems described above, an information processing device includes an acquisition unit configured to obtain a group datum in which a plurality of print layers to be printed in a stacked manner is grouped, and a display controller configured to make a display unit output a plurality of icons which corresponds respectively to the plurality of print layers included in the group datum, and which is arranged in an order of stacking the print layers corresponding to the icons, as layer configuration information representing a layer configuration of the group datum.

DESCRIPTION OF EXEMPLARY EMBODIMENTS

Figure 1:
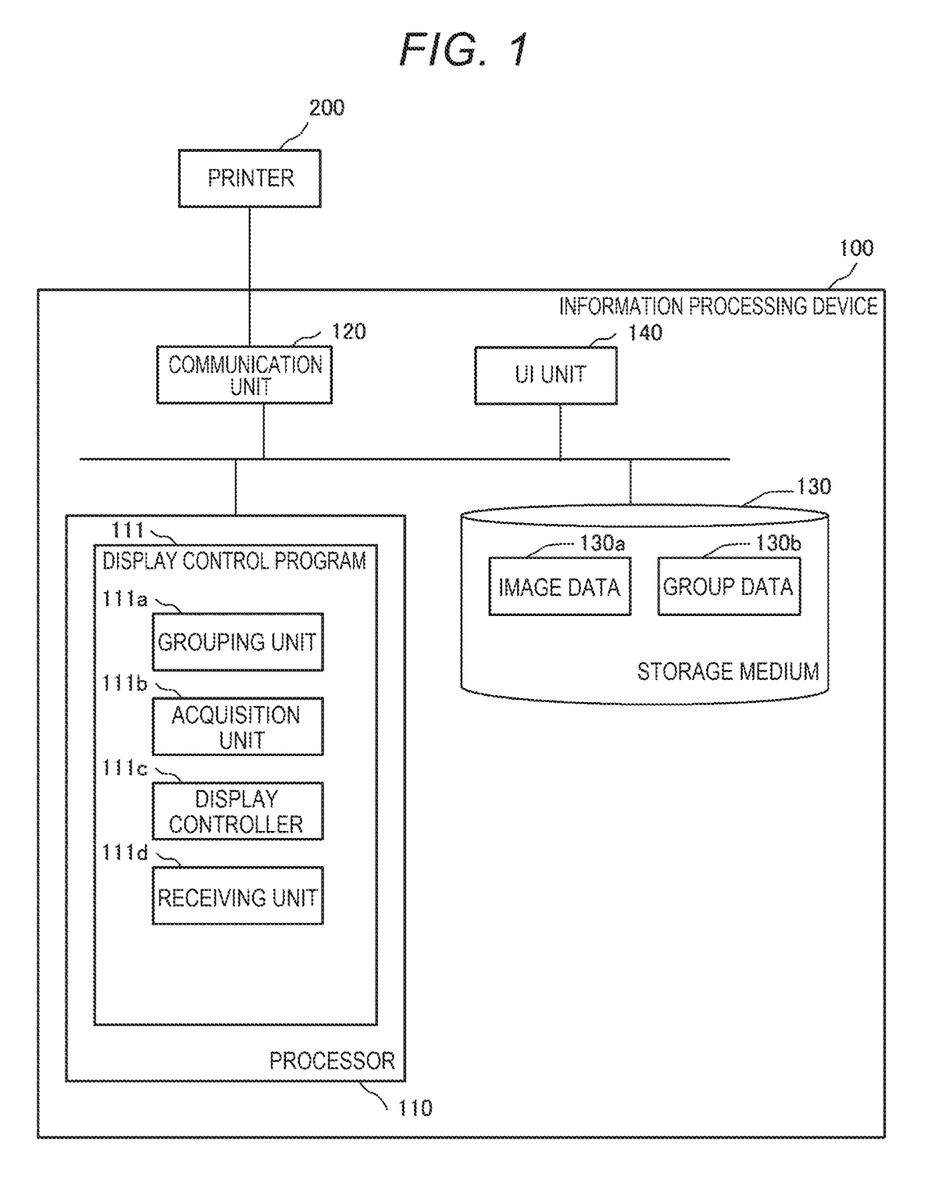
FIG. 1 is a diagram showing an example of a configuration of an information processing device.

Here, some embodiments of the present disclosure will be described along an order described below.
(1) First Embodiment:
(1-1) Configuration of Information Processing Device:
(1-2) Processing of Information Processing Device:
(2) Second Embodiment:
(3) Other Embodiments:

(1) First Embodiment (1-1) Configuration of Information Processing Device:

FIG. 1 is a diagram showing an example of a configuration of the information processing device 100 according to the present embodiment. The information processing device 100 according to the present embodiment is an information processing device for controlling a printer 200, and is, for example, a personal computer, a tablet device, or a smartphone. In the present embodiment, the information processing device 100 instructs printing of a plurality of print layers stacked on one another to the printer 200. Here, the print layer is a layer to be a printing target to a print medium, and is a player classified by a type of a paint to be used for the formation thereof. Here, the paint is a material to be applied on a surface of the print medium for the sake of decoration, protection, or the like, and a color material, a paint (varnish, clear ink, or the like) for obtaining a surface effect, and so on are cited as the paint. The paint for obtaining the surface effect is hereinafter referred to as a surface effect paint. As the print layer, there are cited a color layer which is formed using at least one of the color materials of cyan (C), magenta (M), yellow (Y), and black (K), a white layer which is formed using a white color material, a surface effect layer which is formed using a predetermined surface effect paint (e.g., varnish or clear ink), and so on. As the color layer, there are cited an image layer for forming an image, a black layer which is formed using the color material of K, and so on. In the present embodiment, the black layer is formed by the color material of K (black) being applied to a designated area in the print medium with a constant density. The black layer is used as, for example, a light blocking layer for blocking at least a part of light transmitted through a plurality of print layers to be printed. It should be noted that the black layer can be formed of the color materials of C, M, and Y in addition to the color material of K, or instead of the color material of K. In the present embodiment, the white layer is formed by the white color material being applied to a designated area in the print medium with a constant density. The white layer is used as, for example, a foundation of the image layer. In the present embodiment, the surface effect layer is formed by the surface effective paint being applied to a designated area in the print medium with a constant density.

The printer 200 is a printer for printing an image on the print medium (e.g., an acrylic plate, a glass plate a medium (e.g., a smartphone case made of resin) made of resin, or a print sheet) in accordance with an instruction from the image processing device 100. In the present embodiment, the printer 200 performs printing on the print medium using the color materials of cyan (C), magenta (M), yellow (Y), black (K), and white, and the predetermined surface effect paint. The paint used by the printer 200 according to the present embodiment is a paint which cures due to irradiation with an ultraviolet ray. In the present embodiment, the printer 200 performs ejection of the paint on the print medium, and the irradiation with the ultraviolet ray on the paint thus ejected to thereby perform printing. The information processing device 100 and the printer 200 are connected to each other so as to be able to communicate with each other with wire or wirelessly.

Hardware included in the information processing device 100 will be described.

The information processing device 100 is provided with a processor 110, a communication unit 120, a storage medium 130, and a UI unit 140. Further, the information processing device 100 is provided with a RAM (Random Access Memory) and a ROM (Read Only Memory). The processor 110 executes a variety of programs stored in the ROM, the storage medium 130, and so on to thereby control the information processing device 100. The processor 110 can be formed of a single chip, or can also be formed of a plurality of chips. Further, the processor 110 is assumed to be a CPU (Central Processing Unit) in the present embodiment, but can be formed of an ASIC or the like, or can also be constituted by a CPU and an ASIC. The communication unit 120 is provided with a circuit to be used for the communication compliant with a variety of types of wired or wireless communication protocol with external equipment such as the printer 200. The storage medium 130 stores a variety of programs such as a display control program 111 for executing processing of controlling printing via the printer 200 and a variety of types of information such as image data 130a and group data 130b.

The image data 130a are data of a plurality of images (print layers) to be print candidates. In the present embodiment, the image data 130a are each an RGB datum representing each of pixels of the image divided by a predetermined number of pixels (e.g., 640×480 or 1200×1600) using grayscale values of three channels of RGB.

The group data 130b are each a datum obtained by grouping the plurality of print layers to be printed so as to be stacked on one another as the printing target. In the present embodiment, the group data 130b are generated by a function of a grouping unit 111a described later.

The UI unit 140 is provided with an input unit which receives an input from a user such as an operation unit of a mouse, a keyboard, a touch pad, or a touch panel, and a display unit such as a monitor or a display of the touch panel.

Subsequently, a function of the information processing device 100 will be described.

The processor 110 of the information processing device 100 executes the display control program 111 stored in the storage medium 130 to thereby function as the grouping unit 111a, an acquisition unit 111b, a display controller 111c, a receiving unit 111d, and a decision unit 111e.

The grouping unit 111a is a function of grouping the plurality of print layers designated as the plurality of print layers to be printed so as to be stacked on one another as the group datum 130b. The processor 110 receives the designation of the plurality of print layers to be included in the group datum, and the order of stacking the print layers based on the operation of the UI unit 140 by the user due to the function of the grouping unit 111a, then groups the plurality of print layers thus designated as the plurality of print layers to be printed in the order thus designated, and then stores the result as the group datum 130b. Here, processing related to the function of the grouping unit 111a in the present embodiment will be described.

Figure 2:
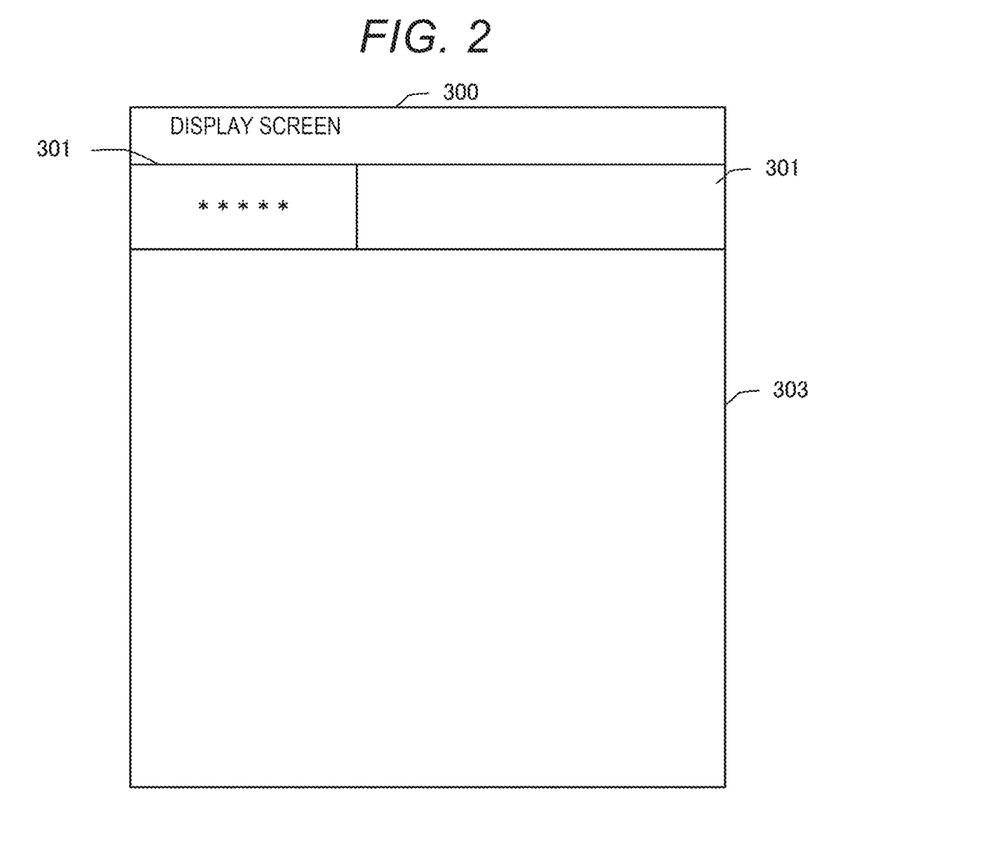
FIG. 2 is a diagram showing an example of a display screen.

When the processor 110 receives an instruction of starting the grouping processing of the print layers, the processor 110 displays a display screen 300 to be used for grouping the print layers, displaying the variety of types of information of the group datum 130b obtained by grouping, and so on. The display screen 300 in the present embodiment is shown in FIG. 2. As the display screen 300, there is displayed the display screen 300 including a display field 301 for displaying the name of the group datum 130b, a display field 302 to be used for displaying layer configuration information representing a layer configuration of the plurality of print layers thus grouped, and an input field 303 for receiving the designation of the print layers to be grouped.

The user inputs the name of the group datum 130b to be generated in the display field 301 via the UI unit 140. Further, the user drags and drops data (e.g., icons of files) representing the plurality of print layers corresponding to the print layers desired to be grouped on the input field 303 in an order of a desire of stacking. In the present embodiment, the user drags and drops the icons corresponding to images desired to be grouped out of the icons of the files of the respective print layers represented by the image data 130a on the input field 303. In other words, defining a side of a surface on which printing is performed out of the surfaces of the print medium as a lower side, the user first drags and drops the datum representing the print layer desired to be arranged at the lowermost side on the input field 303. Subsequently, the user drags and drops the datum representing the print layer which is desired to be arranged on the print layer arranged at the lowermost side, namely which is desired to be arranged at the second lowermost side, on the input field 303. As described above, the user drags and drops the data representing the print layers desired to be stacked in the order of stacking on the input field 303.

When the processor 110 detects the drag and drop of the plurality of data representing the print layers on the input field 303, the processor 110 groups the print layers corresponding to the data as the print layers to be stacked in the order in which the data have been dragged and dropped. The processor 110 stores the plurality of print layers thus grouped in the storage medium 130 as the group datum 130b having the name input in the display field 301.

The acquisition unit 111b is a function of obtaining the group datum 130b in which a plurality of print layers to be printed so as to be stacked on one another is grouped in advance. In the present embodiment, the processor 110 obtains the group datum 130*b* stored in the storage medium 130 due to the function of the acquisition unit 111*b*. In the present embodiment, when the group datum 130*b* is stored in the storage medium 130 due to the function of the grouping unit 111*a*, the processor 110 obtains the group datum 130*b*.

The display controller 111*c* is a function of outputting the layer configuration information representing the layer configuration of the group datum 130*b* obtained by the function of the acquisition unit 111*b* to the display unit. Here, the layer configuration means the order of stacking the variety of print layers included in the group datum 130*b*. Further, the layer configuration information is information representing what types of print layers are stacked in what order, and are icons corresponding respectively to the print layers arranged in the order of stacking in the present embodiment. In the present embodiment, the processor 110 makes the UI unit 140 display the layer configuration information of the group datum 130*b* due to the function of the display controller 111*c*. The details of the processing related to the function of the display controller 111*c* will hereinafter be described.

The processor 110 identifies the plurality of print layers and the order of stacking included in the group datum 130*b* obtained by the function of the acquisition unit 111*b*. The processor 110 obtains the icons respectively representing the print layers thus identified. In the present embodiment, as the icons representing the print layers, the processor 110 obtains the icons each shaped like a rectangle with a background corresponding to the type of the corresponding print layer. In the present embodiment, as the icon representing the print layer of the image layer (the color layer), the processor 110 obtains the rectangular icon with a hatched background. Further, as the icon representing the print layer of the white layer, the processor 110 obtains the rectangular icon with a white background. Further, as the icon representing the print layer of the black layer (the color layer), the processor 110 obtains the rectangular icon with a black background. Further, as the icon representing the print layer of the surface effect layer, the processor 110 obtains the rectangular icon with a gray background. It should be noted that as another example, the icons representing the variety of types of print layers can be other icons. For example, the icon representing the print layer of the image layer (the color layer) can be an icon representing that multiple colors are used, for example, an icon with a background of a gradation pattern.

Figure 3:
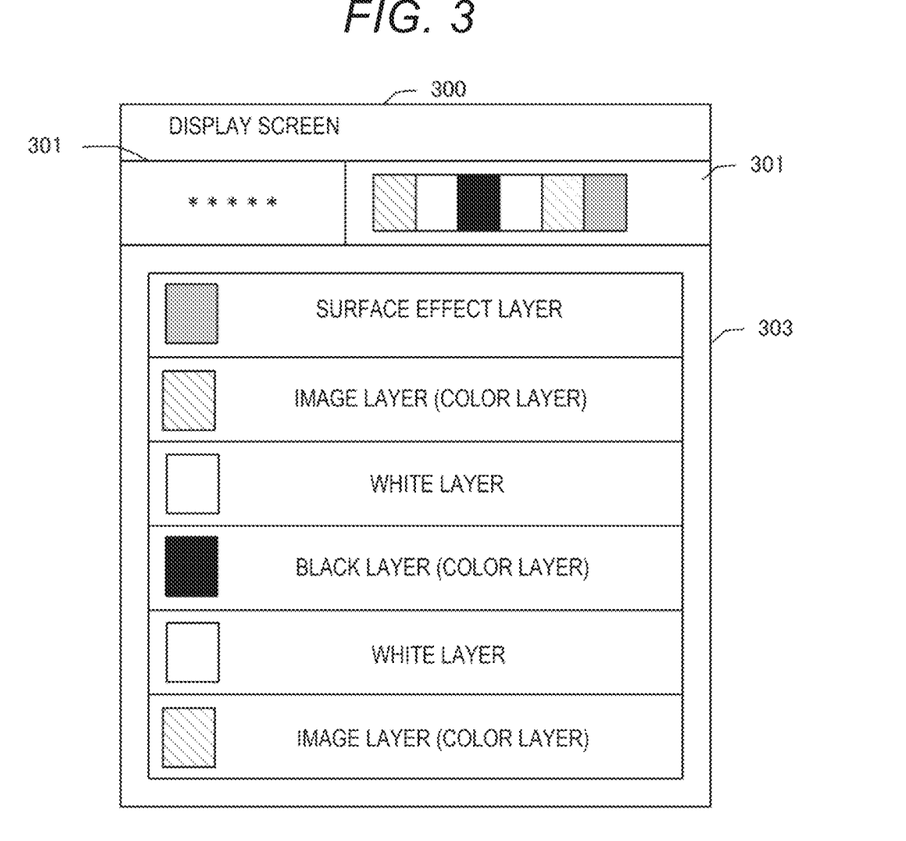
FIG. 3 is a diagram showing an example of display of layer configuration information.

The processor 110 arranges the icons thus obtained left to right in the order of stacking the corresponding print layers, and displays the icons in the display field 302 of the display screen 300 displayed in the UI unit 140. For example, when the group datum 130*b* represents the image layer (the color layer), the white layer, the color layer (the black layer), the white layer, the color layer (the image layer), and the surface effect layer stacked in sequence from the bottom, the processor 110 displays the icons horizontally arranged in the display field 302 as the layer configuration information as shown in FIG. 3. By visually recognizing the layer configuration information, it is possible for the user to easily confirm the order of stacking the plurality of print layers represented by the group datum 130*b*.

Further, the processor 110 displays the predetermined information (information such as the file name, and a point when the print layer was added to the group datum 130*b*) of each of the print layers included in the group datum 130*b* obtained by the function of the acquisition unit 111*b* in the input field 303 of the display screen in the order of stacking.

Thus, it is possible for the processor 110 to present the detailed information of each of the print layers included in the group datum 130*b* to the user.

Here, the receiving unit 111*d* will be described.

The receiving unit 111*d* is a function of receiving a change of the setups of the print layers of the group datum 130*b*. As the setups of the print layer, there are cited a layout (a size, a position, and so on) of the print layer in the print medium, a density of the print layer, and so on. In the present embodiment, the setups of the print layer include the number of times of printing which represents how many times printing of the print layer is repeatedly performed. For example, it is assumed that when performing printing of the plurality of print layers represented by the group datum 130*b*, printing of the print layers is performed once in turns. On this occasion, it is assumed that the thickness of the white layer formed on the print medium is thinner than expected. In such a case, by setting the number of times of printing of the white layer to no smaller than 2, it is possible to increase the thickness of the white layer formed. The print layer in which printing is repeatedly performed a plurality of times is hereinafter referred to as a lapped layer. As described above, in the present embodiment, the receiving unit 111*d* is also a function of receiving a designation of the number of times of printing, namely a repeat count of printing, when setting the print layer as the lapped layer.

When the processor 110 receives an instruction of change of setups of the print layer included in the group datum 130*b* based on the operation of the UI unit 140 by the user due to the function of the receiving unit 111*d*, the processor 110 makes the UI unit 140 display the screen used for the change of the setup of the print layer. In the present embodiment, a predetermined operation (e.g., double-clicking, or selection of a predetermined menu displayed after right-clicking) on any one of the icons displayed in the display field 302 is received as the instruction of the change of the setup of the print layer corresponding to this icon. It should be noted that it is possible for the processor 110 to receive the instruction of the change of the setup of the print layer in other ways. For example, it is possible for the processor 110 to receive an instruction of startup of an application to be used for the change of the setup of each of the print layers included in the group datum 130*b* as the instruction of the change of the setup of the print layer included in the group datum 130*b*.

Depending on the type of the print layer, it is requested to inhibit the print layer from being set as the lapped layer in some cases. For example, regarding the white layer and the surface effect layer, an adjustment of the thickness is requested as needed in some cases for the sake of an adjustment of whiteness as the foundation, an adjustment of the glaze of the surface, and so on, and regarding the color layer, an adjustment of the thickness is requested in some cases for the sake of prevention of the print result from becoming unexpected one, and so on.

Figure 4:
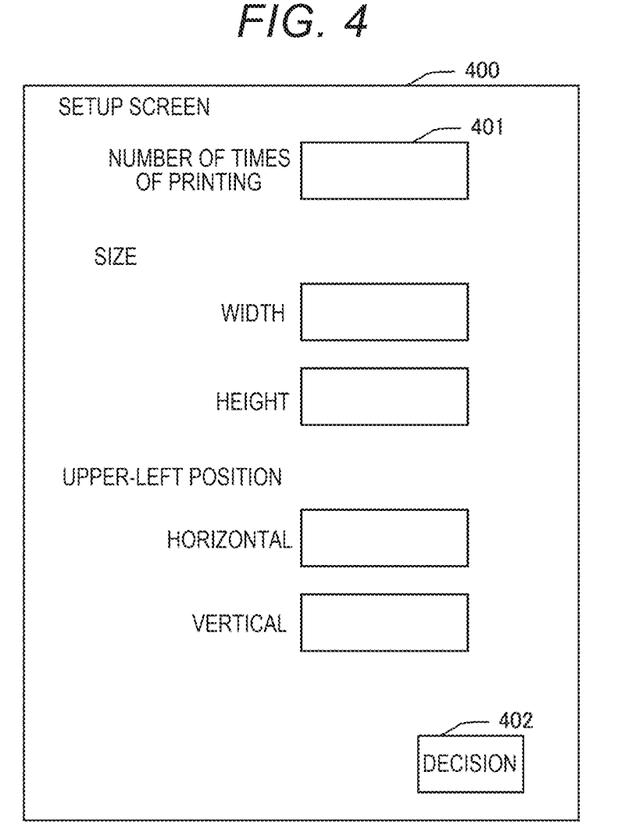
FIG. 4 is a diagram showing an example of a setup screen.

Therefore, in the present embodiment, when the processor 110 receives the instruction of the change of the setup of the print layer included in the group datum 130*b*, the processor 110 makes the UI unit 140 display a setup screen 400 which is also used for the designation of the number of times of printing when the target print layer of the setup change is the white layer or the surface effect layer. Here, the setup screen 400 to be displayed is shown in FIG. 4. The setup screen 400 includes an input field 401 to be used for the designation of the number of times of printing, a decision button 402, and input fields to be used for designation of a size and a position of the print layer in the print medium.

The user inputs the repeat count of printing requested with respect to the target print layer of the setup change in the input field 401 via the UI unit 140. When the processor 110 detects the selection of the decision button 402 in the state in which a value is input in the input field 401, the processor 110 sets the number of time of printing of the target print layer of the setup change included in the group datum 130*b* as the value input in the input field 401. More specifically, the processor 110 makes the group datum 130*b* include the information representing the fact that printing is repeated as much times as the value input in the input field 401 with respect to the target print layer of the setup change. Further, when a value is input in any other input fields of the setup screen 400, the processor 110 changes the setup of the target print layer of the setup change in accordance with the value thus input.

Further, when the processor 110 receives the instruction of the change of the setup of the print layer included in the group datum 130*b*, the processor 110 makes the UI unit 140 display a setup screen 400 which does not include the input field 401 when the target print layer of the setup change is the color layer. On this occasion, when a value is input in each of the input fields, the processor 110 changes the setup of the target print layer of the setup change in accordance with the value thus input when the processor 110 detects the selection of the decision button 402.

Going back to the description of the display controller 111*c*, there will hereinafter be described display control processing of the layer configuration information when the group datum 130*b* includes the print layer (the lapped layer) in which the number of times of printing is designated by the function of the receiving unit 111*d*.

Figure 5:
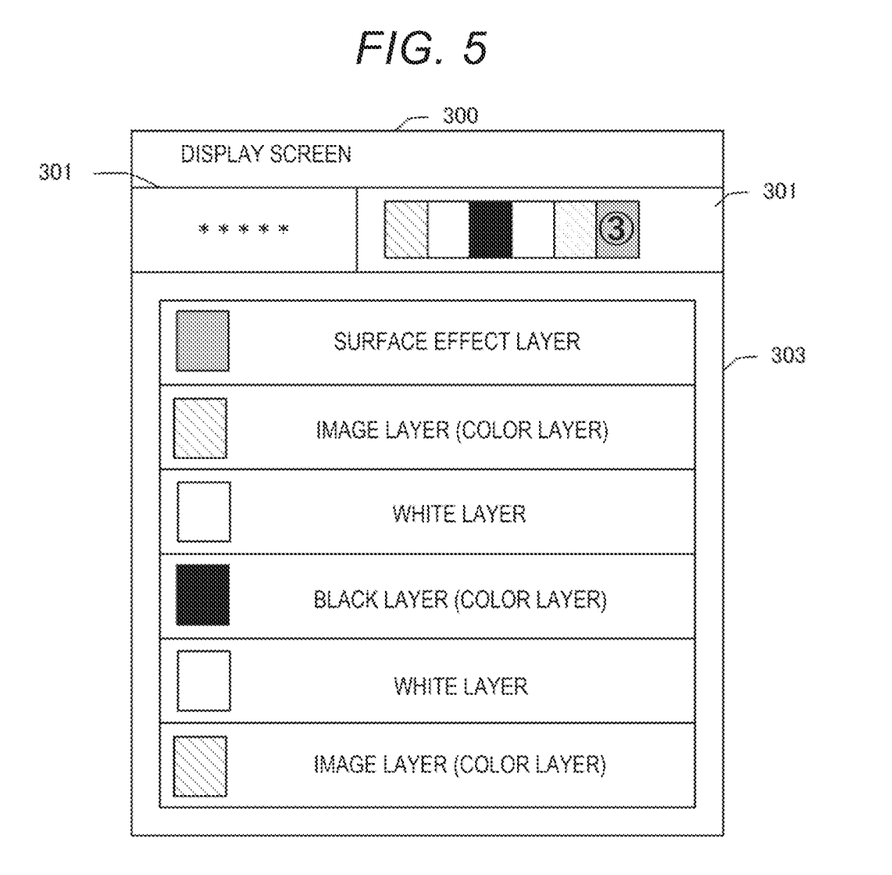
FIG. 5 is a diagram showing an example of layer configuration information of a group datum including a lapped layer.

When the print layer as the lapped layer is included in the group datum 130*b*, the processor 110 makes the UI unit 140 display the layer configuration information representing the fact that the lapped layer is included in the group datum 130*b* when the processor 110 displays the layer configuration information of the group datum 130*b*. In the present embodiment, the processor 110 makes the UI unit 140 display the information representing the number of times of printing of the print layer as the lapped layer as the layer configuration information. More specifically, the processor 110 obtains the icons representing the print layers included in the group datum 130*b* similarly to when the print layer as the lapped layer is not included in the group datum 130*b*. The processor 110 superimposes the repeat count of printing (the number of times of printing) of the print layer as the lapped layer on the icon representing this print layer. Then, the processor 110 makes the UI unit 140 display the information in which the plurality of icons representing the plurality of print layers included in the group datum 130*b* is arranged in the order of stacking the corresponding print layers as the layer configuration information. In other words, the processor 110 makes the UI unit 140 display the information including the icon representing the number of times of printing of the print layer as the lapped layer as the layer configuration information. FIG. 5 shows the layer configuration information to be displayed when the surface effect layer is the lapped layer in which printing is performed three times in the group datum 130*b* having the same layer configuration as shown in FIG. 3.

Figure 6:
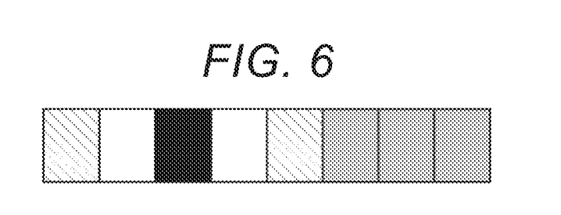
FIG. 6 is a diagram showing an example of the layer configuration information of the group datum including the lapped layer.

It should be noted that as another example, it is possible for the processor 110 to arrange the icons each representing the print layer which is not the lapped layer as much as the number of times of printing to display the icons as shown in FIG. 6 with respect to the print layer as the lapped layer. It should be noted that the icon on which the number of times of printing is superimposed as shown in FIG. 5 is smaller in size than when arranging the icons as much as the number of times of printing to display the icons.

As described hereinabove, according to the configuration of the present embodiment, the information processing device 100 makes the UI unit 140 display the information in which the icons corresponding to the print layers are arranged side by side as the layer configuration information representing the layer configuration with respect to the group datum 130*b* in which the plurality of print layers to be printed in a stacked manner is grouped. Thus, it is possible for the user to easily confirm the order of stacking the print layers of the group datum 130*b*. In other words, it is possible for the information processing device 100 to help the user confirm the order of stacking the print layers of the group datum 130*b*.

For example, when using a paint which cures due to the UV irradiation as in the printer 200, it becomes possible to print a larger number of print layers in a stacked manner compared to printing using other paints. In such a case, the layer configuration of the plurality of print layers to be printed in the stacked manner becomes complicated in some cases. The information processing device 100 according to the present embodiment capable of making the confirmation by the visual recognition of the layer configuration easy even when the layer configuration of the plurality of print layers becomes complicated as described above.

Further, in the present embodiment, when the print layer as the lapped layer is included in the group datum 130*b*, the information processing device 100 makes the UI unit 140 display the layer configuration information representing the fact that the print layer as the lapped layer is included. Thus, it is possible for the information processing device 100 to present the fact that the lapped layer is included in the group datum 130*b* to the user.

Further, in the present embodiment, the information processing device 100 makes the UI unit 140 display the information including the icon representing the number of times of printing of the print layer as the lapped layer as the layer configuration information. Thus, it is possible for the information processing device 100 to present the number of times of printing of the print layer as the lapped layer to the user.

Further, in the present embodiment, the information processing device 100 uses an icon smaller in size than when arranging the icons of the print layer which is not the lapped layer as much as the number of times of printing to display the icons thus arranged as the icon representing the print layer as the lapped layer included in the layer configuration information. Thus, it is possible for the information processing device 100 to save the display area of the UI unit 140. Further, it is possible for the information processing device 100 to make the layer configuration information simpler, to make the user easier to figure out the layer configuration of the group datum 130*b*.

(1-2) Processing of Information Processing Device:

Processing to be executed by the information processing device 100 will be described using FIG. 7 through FIG. 9.

The grouping processing for grouping the print layers to be printed in a stacked manner will be described using FIG. 7. When the processor 110 receives an instruction of starting the grouping processing of the print layers, the processor 110 starts the processing shown in FIG. 7.

In the step S100, the processor 110 makes the UI unit 140 display the display screen 300 due to the function of the grouping unit 111a. After the completion of the processing in the step S100, the processor 110 proceeds the processing to the step S105.

In the step S105, the processor 110 receives the designation of the name of the group datum 130b as a generation target to the display field 301 based on the operation of the UI unit 140 by the user due to the function of the grouping unit 111a. Further, the processor 110 detects the drag and drop of the plurality of data representing the print layers on the input field 303, and then groups the print layers corresponding to the data as the print layers to be stacked in the order in which the data have been dragged and dropped. The processor 110 stores the plurality of print layers thus grouped in the storage medium 130 as the group datum 130b having the name input in the display field 301. After the completion of the processing in the step S105, the processor 110 completes the processing shown in FIG. 7.

Subsequently, display control processing for displaying the layer configuration information of the group datum 130b using FIG. 8.

Figure 7:
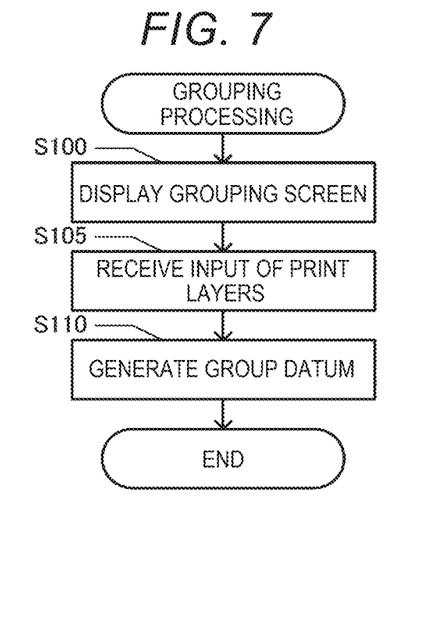
FIG. 7 is a flowchart showing an example of grouping processing.
Figure 8:
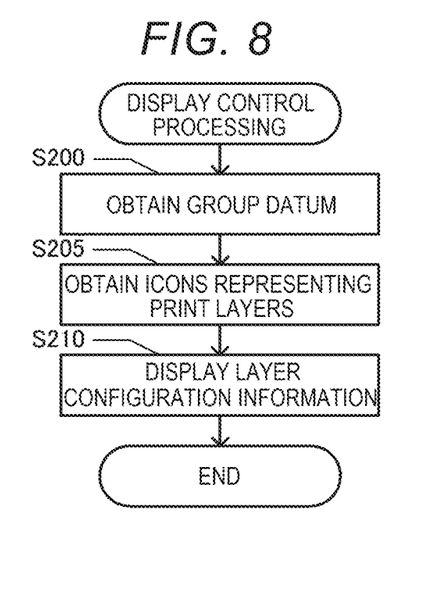
FIG. 8 is a flowchart showing an example of display control processing.

The processor 110 starts the processing shown in FIG. 8 at the timing at which the group datum 130b is stored in the storage medium 130 due to the processing shown in FIG. 7.

In the step S200, the processor 110 obtains the group datum 130b from the storage medium 130 due to the function of the acquisition unit 111b. The processing in the step S200 is an example of an acquisition step. After the completion of the processing in the step S200, the processor 110 proceeds the processing to the step S205.

In the step S205, the processor 110 identifies the types of the plurality of print layers and the order of stacking included in the group datum 130b obtained in the step S200 due to the function of the display controller 111c. The processor 110 obtains the icons respectively representing the print layers thus identified.

In the step S210, the processor 110 makes the UI unit 140 display the plurality of icons which is obtained in the step S205 due to the function of the display controller 111c, and which is arranged left to right in the order of stacking the corresponding print layers, as the layer configuration information. The processing in the step S210 is an example of a display control step. After the completion of the processing in the step S210, the processor 110 completes the processing shown in FIG. 8.

Subsequently, setup change processing for changing the setups of the print layers included in the group datum 130b using FIG. 9.

Figure 9:
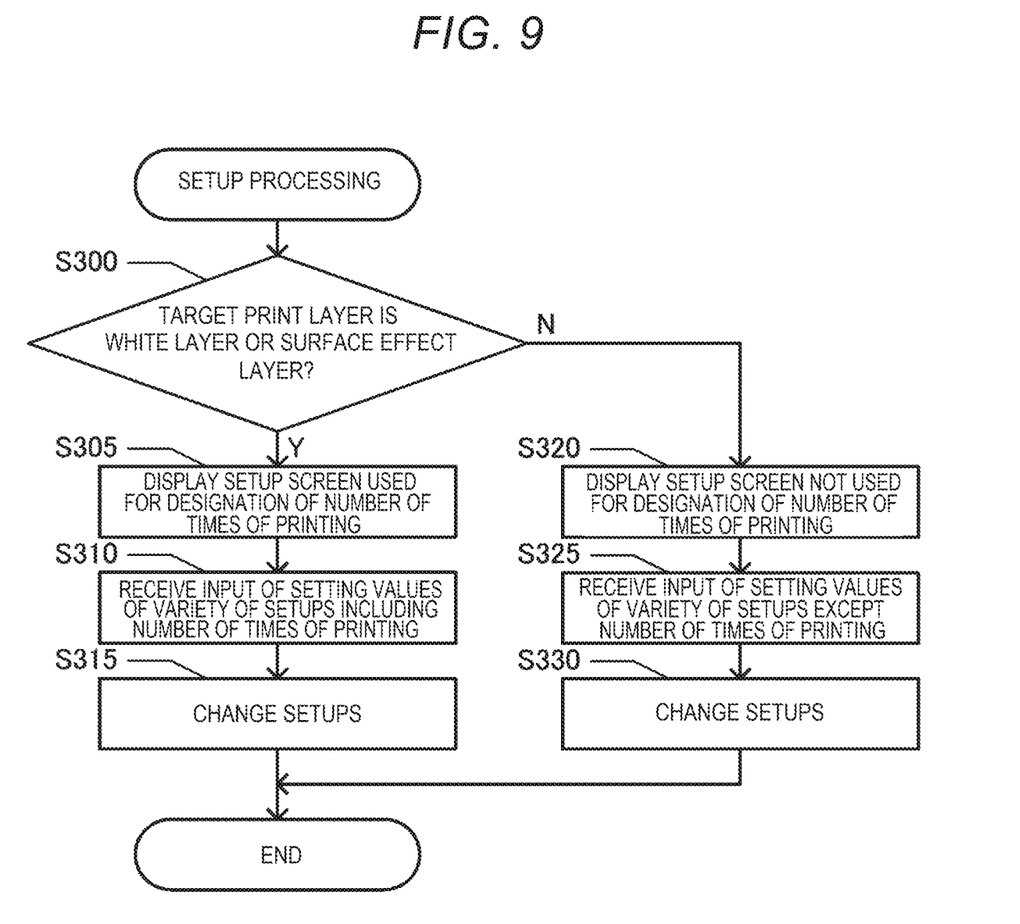
FIG. 9 is a flowchart showing an example of setup processing.

When the processor 110 receives an instruction of changing the setups of the print layers included in the group datum 130b, the processor 110 starts the processing shown in FIG. 9.

In the step S300, the processor 110 determines whether or not the type of the print layer to be the target of the setup change is one of the white layer and the surface effect layer due to the function of the receiving unit 111d. When the processor 110 determines that the type of the print layer to be the target of the setup change is one of the white layer and the surface effect layer, the processor 110 proceeds the processing to the step S305. Further, when the processor 110 determines that the type of the print layer to be the target of the setup change is neither the white layer nor the surface effect layer, the processor 110 proceeds the processing to the step S320.

In the step S305, the processor 110 makes the UI unit 140 display the setup screen 400 including the input field 401 due to the function of the receiving unit 111d. After the completion of the processing in the step S305, the processor 110 proceeds the processing to the step S310.

In the step S310, the processor 110 receives the input to the input fields of the setup screen 400 due to the function of the receiving unit 111d. Here, the processor 110 receives at least the input to the input field 401. After the completion of the processing in the step S310, the processor 110 proceeds the processing to the step S315.

In the step S315, when the processor 110 detects the selection of the decision button 402 due to the function of the receiving unit 111d, the processor 110 sets the number of times of printing of the target print layer of the setup change as the value input to the input field 401. When a value is input in any other input fields of the setup screen 400, the processor 110 changes the setup of the target print layer of the setup change in accordance with the value thus input. After the completion of the processing in the step S315, the processor 110 completes the processing shown in FIG. 9.

In the step S320, the processor 110 makes the UI unit 140 display the setup screen 400 which does not include the input field 401 due to the function of the receiving unit 111d. After the completion of the processing in the step S320, the processor 110 proceeds the processing to the step S325.

In the step S325, the processor 110 receives the input to the input fields of the setup screen 400 due to the function of the receiving unit 111d. Here, the processor 110 receives at least the input to the input field.

In the step S330, when the processor 110 detects the selection of the decision button 402 due to the function of the receiving unit 111d, the processor 110 changes the setup of the target print layer of the setup change in accordance with values input to the input fields of the setup screen 400. After the completion of the processing in the step S330, the processor 110 completes the processing shown in FIG. 9.

In the present embodiment, the processor 110 performs the processing shown in FIG. 8 once again after the completion of the processing shown in FIG. 9. On this occasion, in the step S205, the processor 110 displays the icon on which the number of times of printing of the corresponding print layer is superimposed as the icon representing the print layer as the lapped layer included in the layer configuration information of the group datum 130b.

(2) Second Embodiment

Figure 10:
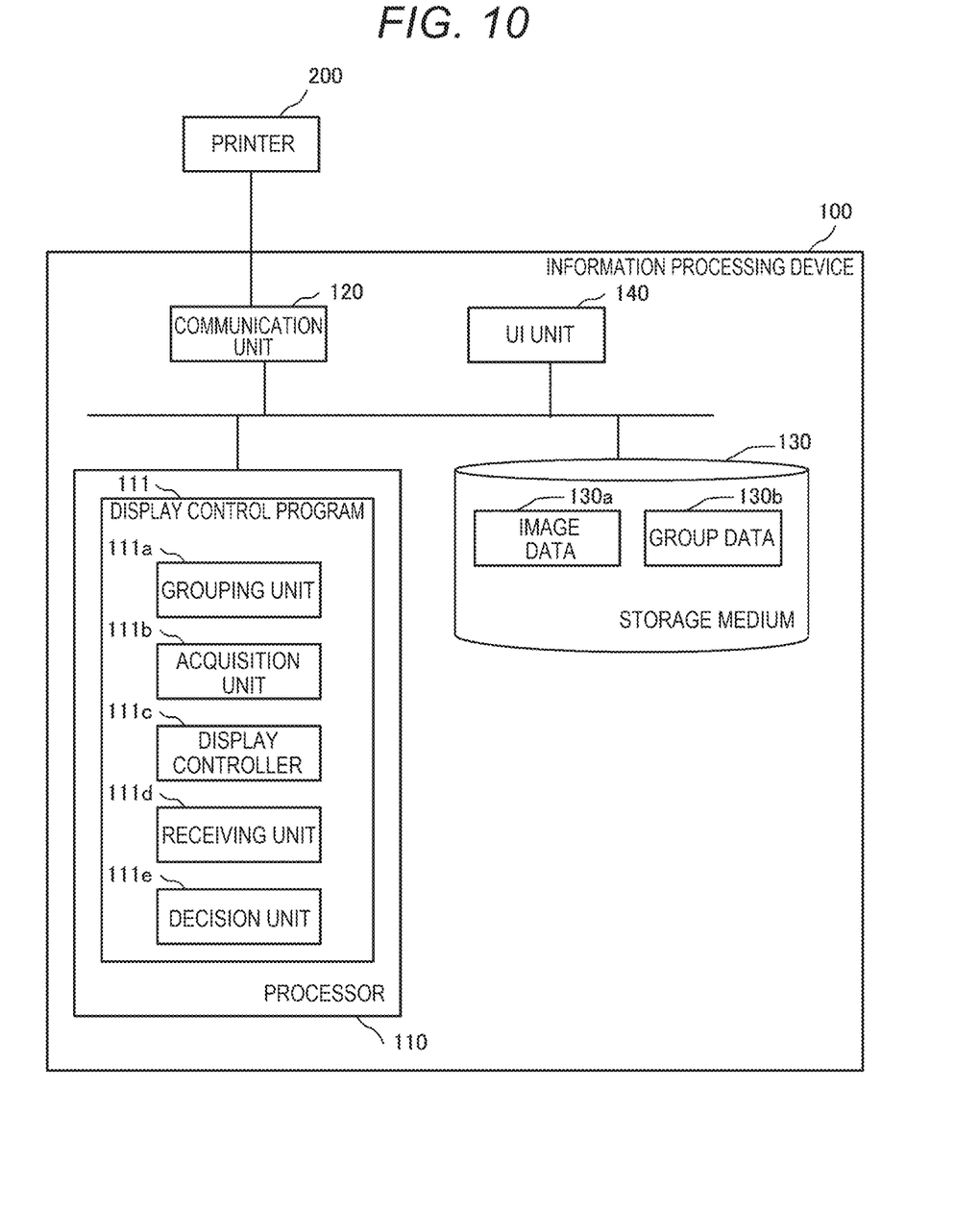
FIG. 10 is a diagram showing an example of a configuration of an information processing device.

A second embodiment will be described. FIG. 10 shows a configuration of an information processing device 100 according to the present embodiment. The information processing device 100 according to the present embodiment is different from that of the first embodiment in the point that the information processing device 100 executes the display control program 111 to thereby further function as a decision unit 11e in addition to the grouping unit 111a, the acquisition unit 111b, the display controller 111c, and the receiving unit 111d.

It should be noted that in the present embodiment, the description is presented assuming that the information processing device 100 generates the plurality of group data 130b in advance due to the function of the grouping unit 111a.

The decision unit 111e is a function of deciding the group data 130b the same in layer configuration as nesting targets, and deciding the group data 130b different in layer configuration from each other to be prevented from becoming the nesting targets. Here, the nesting means printing a plurality of print data so as to be arranged side by side.

Figure 11:
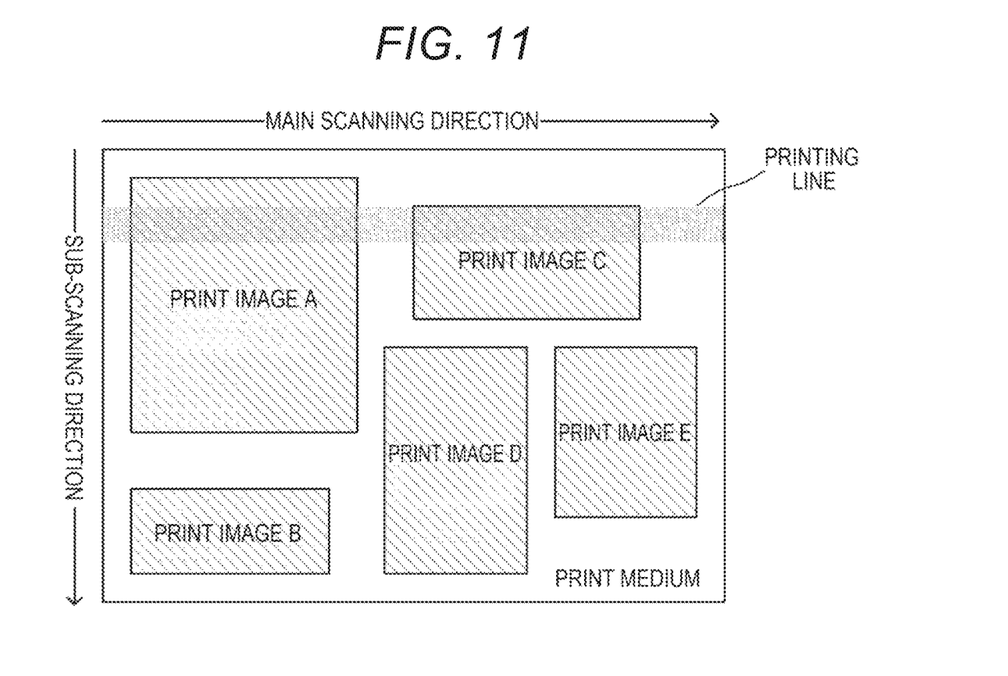
FIG. 11 is a diagram for explaining nesting.

The nesting will be described using FIG. 11. FIG. 11 shows a print medium arranged in a print medium tray of the printer 200, and a plurality of print images (print images A through E) to be printed in a lump on the print medium. The printer 200 is provided with a print head to be used for ejecting the paint to the print medium, and repeats printing line by line on the print medium via the print head to thereby perform printing. The direction of this line is hereinafter referred to as a main scanning direction. Further, a direction perpendicular to the main scanning direction, and parallel to the print medium arranged when performing printing is hereinafter referred to as a sub-scanning direction. The printer 200 performs printing with the number of printing passes designated. Here, the printing pass means printing of a single line performed by the print head of the printer 200 while moving on the print medium from end to end in the main scanning direction. A range which the print head can scan while moving once on the print medium from end to end in the main scanning direction is hereinafter referred to as a printing line. In the nesting, for example, when the printer 200 prints the printing line shown in FIG. 11, printing of the print image A and the print image C is performed at the same time. As described above, in the nesting, it results that a plurality of print images is arranged in the main scanning direction. In other words, it results that the printer 200 prints a plurality of images with a single scanning operation of the print head. When performing printing, the printer 200 performs the printing in certain printing conditions (conditions such as the number of printing passes, and image resolution). Therefore, the images to be the printing target are required to coincide with each other in predetermined printing conditions such as the number of printing passes and the image resolution. As described above, the print data to be the nesting target are required to coincide with each other in predetermined printing conditions. When the print images including the plurality of print layers are nested, it is required for each of the print layers in the print images to coincide with each other in predetermined printing conditions.

Regarding the print layers the same in type, substantially the same printing conditions are set. Therefore, the group data 130b the same in layer configuration become substantially the same in printing conditions.

Therefore, the processor 110 identifies the layer configuration with respect to the plurality of group data 130b stored in the storage medium 130 due to the function of the decision unit 11e. More specifically, the processor 110 identifies what type of print layers are stacked on one another in what order as the layer configuration with respect to each of the group data 130b. Then, the processor 110 extracts a plurality of layer configurations the same as each other from the layer configurations thus identified. The processor 110 decides the plurality of group data 130b corresponding to the plurality of layer configurations thus extracted as the nesting target. Further, the processor 110 decides the group data 130 corresponding to the layer configurations different from each other so as not to become the nesting target.

As described hereinabove, according to the configuration of the present embodiment, it is possible for the information processing device 100 to reduce the occurrence of the situation of erroneously setting the group data 130b which cannot be printed in a lump as the nesting target.

(3) Other Embodiments

The embodiments described above are each an example for implementing the present disclosure, and a variety of embodiments can be adopted besides the above. For example, although in each of the embodiments described above, the information processing device 100 and the printer 200 are configured as devices different from each other, the both devices can also be configured as the same device. For example, the functions of the information processing device 100 can be implemented in the printer 200. Further, it is possible for the information processing device 100 to be constituted by a plurality of devices.

In each of the embodiments described above, it is assumed that the processor 110 groups the plurality of print layers to be printed in a stacked manner using the display screen 300. It should be noted that it is possible for the processor 110 to group the plurality of print layers to be printed in a stacked manner in other ways. For example, it is possible for the processor 110 to receive the designation of the order of stacking the print layers in a text data format, and then group the plurality of print layers which are printed so as to be stacked in the order represented by the designation thus received as the group datum 130b.

Figure 12:
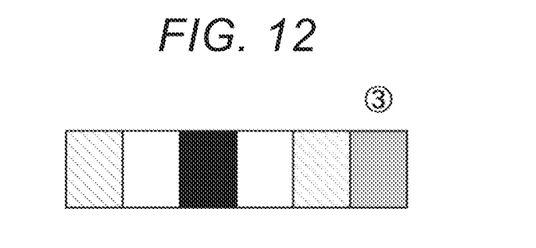
FIG. 12 is a diagram showing an example of an icon of the lapped layer.
Figure 13:
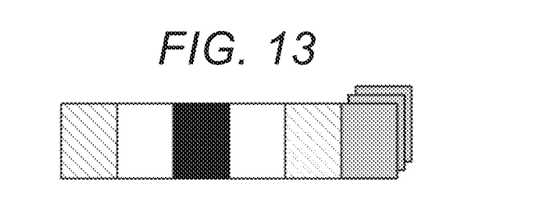
FIG. 13 is a diagram showing an example of an icon of the lapped layer.

Further, in each of the embodiments described above, it is assumed that the icon obtained by superimposing the number of times of printing on the icon in accordance with the type of the print layer is defined by the processor 110 as the icon of the print layer as the lapped layer to be displayed as the layer configuration information. It should be noted that it is possible for the processor 110 to use another icon smaller in size than when arranging the icons as much as the number of times of printing (the icons as much as the repeat count of printing) as the icon of the print layer as the lapped layer to be displayed as the layer configuration information. For example, it is possible for the processor 110 to use an icon adjacent to which the number of times of printing is described as shown in FIG. 12. Further, it is possible for the processor 110 to use icons overlapping as much as the number of times of printing as shown in FIG. 13.

Further, in each of the embodiments described above, it is assumed that the processor 110 displays the information in which the icons corresponding to the print layers included in the group datum 130b are arranged left to right in the order of stacking the print layers as the layer configuration information. It should be noted that it is possible for the processor 110 to display other information as the layer configuration information as long as the icons are arranged in the order of stacking the print layers. For example, it is possible for the processor 110 to display the information in which the icons corresponding to the print layers included in the group datum 130b are arranged from bottom up in the order of stacking the print layers as the layer configuration information.

Further, in each of the embodiments described above, it is assumed that the processor 110 displays the layer configuration information when grouping the plurality of print layers via the display screen 300. It should be noted that it is possible for the processor 110 to display the layer configuration information in other aspects.

For example, it is possible for the processor 110 to obtain the group datum 130b grouped in advance of a processing time point due to the functions of the acquisition unit 111b and the display controller 111c, and then display the layer configuration information of the group datum 130b thus obtained on the UI unit 140. For example, it is possible for the processor 110 to make the UI unit 140 display the layer configuration information in addition to the screen to be used for the instruction of printing of the group datum 130b, or so as to be included in this screen, in advance of the printing of the group datum 130b. Thus, the processor 110 can present the layer configuration of the group datum 130*b* even at the timing (e.g., the timing before the printing, and the timing when the confirmation of the layer configuration is requested) other than the timing when the group datum 130*b* is generated. As a result, it is possible for the user to confirm whether or not the layer configuration of the print layers is set correctly regarding the group datum 130*b* prepared in advance.

Further, in each of the embodiments described above, it is assumed that the processor 110 performs the control so as to receive the designation of the number of times of printing when making the lapped layer when the type of the print layer as the target of the setup change is one of the white layer and the surface effect layer, and so as not to receive the designation in the case of other types due to the function of the receiving unit 111*d*. It should be noted that it is possible for the processor 110 to control whether to receive the designation of the number of times of printing when making the lapped layer in other ways in accordance with the type of the print layer as the target of the setup change. For example, it is possible for the processor 110 to perform the control so as to receive the designation of the number of times of printing when making the lapped layer when the print layer as the target of the setup change is the white layer, and so as not to receive the designation of the number of times of printing when making the lapped layer in the case of other types. Further, it is possible for the processor 110 to perform the control so as to receive the designation of the number of times of printing when making the lapped layer when the print layer as the target of the setup change is any one of the black layer (the color layer), the white layer, and the surface effect layer, and perform the control so as not to receive the designation in the case of other types.

Further, in each of the embodiments described above, it is assumed that the printer 200 is the printer for performing printing using the paint which cures due to the irradiation with the ultraviolet ray, but the printer 200 can be a printer for performing printing using other paints.

Further, the present disclosure can also be applied as a program and a method to be executed by a computer. Further, the system, the program, and the method described above can be realized by a single device in some cases, or can also be realized by using components provided to a plurality of devices in some cases, and therefore, include a variety of aspects. For example, a modification such as a configuration of partially using software and partially using hardware can arbitrarily be adopted. Further, the present disclosure is also realized as a computer-readable recording medium storing the program for controlling an information processing device. Obviously, the recording medium for storing the program can be a magnetic recording medium or a semiconductor memory, and completely the same also applies to any recording media to be developed in the future.

What is claimed is:

1. An information processing device comprising:
   an acquisition unit configured to obtain a group datum in which a plurality of print layers to be printed in a stacked manner is grouped; and
   a display controller configured to make a display unit output a plurality of icons which corresponds respectively to the plurality of print layers included in the group datum, and which is arranged in an order of stacking the print layers corresponding to the icons, as layer configuration information representing a layer configuration of the group datum,
   wherein when the print layer representing a lapped layer where repeated printing is performed a plurality of times is included in the group datum, the display controller makes the display unit display the layer configuration information representing that the lapped layer is included in the group datum.

2. The information processing device according to claim 1, wherein
   the display controller makes the display unit display the layer configuration information representing a repeat count of printing with respect to the print layer representing the lapped layer.

3. The information processing device according to claim 1, wherein
   as the layer configuration information, the display controller makes the display unit display the plurality of icons corresponding respectively to the plurality of print layers included in the group datum, and makes the display unit display the icon smaller in size than when arranging the icons of the print layer which is not the lapped layer as much as the repeat count of printing with respect to the print layer as the lapped layer.

4. The information processing device according to claim 1, further comprising:
   a receiving unit configured to receive a designation of a repeat count of printing when setting the print layer as the lapped layer.

5. The information processing device according to claim 4, wherein
   the receiving unit controls whether to receive the designation in accordance with a type of the print layer.

6. The information processing device according to claim 1, further comprising:
   a decision unit configured to decide a plurality of the group data same in the layer configuration as a nesting target, and configured to decide a plurality of the group data different in the layer configuration so as not to be set as the nesting target.

7. The information processing device according to claim 1, wherein
   the acquisition unit obtains the group datum in which a plurality of the print layers is grouped in advance.

8. An information processing method to be executed by an information processing device, the method comprising:
   an acquisition step of obtaining a group datum in which a plurality of print layers to be printed in a stacked manner is grouped; and
   a display control step of making a display unit output a plurality of icons which corresponds respectively to the plurality of print layers included in the group datum, and which is arranged in an order of stacking the print layers corresponding to the icons, as layer configuration information representing a layer configuration of the group datum,
   wherein when the print layer representing a lapped layer where repeated printing is performed a plurality of times is included in the group datum, the display control step makes the display unit display the layer configuration information representing that the lapped layer is included in the group datum.

9. A non-transitory computer-readable storage medium storing a program for making a computer execute a method comprising:
   an acquisition step of obtaining a group datum in which a plurality of print layers to be printed in a stacked manner is grouped; and
   a display control step of making a display unit output a plurality of icons which corresponds respectively to the plurality of print layers included in the group datum, and which is arranged in an order of stacking the print layers corresponding to the icons, as layer configuration information representing a layer configuration of the group datum, wherein when the print layer representing a lapped layer where repeated printing is performed a plurality of times is included in the group datum, the display control step makes the display unit display the layer configuration information representing that the lapped layer is included in the group datum.

\* \* \* \* \*